United States Patent [19]
Schlage

[11] Patent Number: 5,307,468
[45] Date of Patent: Apr. 26, 1994

[54] DATA PROCESSING SYSTEM AND METHOD FOR CONTROLLING THE LATTER AS WELL AS A CPU BOARD

[75] Inventor: Thomas Schlage, Waldshut-Tiengen, Fed. Rep. of Germany

[73] Assignee: Digital Equipment Corporation, Maynard, Mass.

[21] Appl. No.: 20,002

[22] Filed: Feb. 17, 1993

Related U.S. Application Data

[63] Continuation of Ser. No. 684,890, Apr. 23, 1991, abandoned.

[30] Foreign Application Priority Data

Aug. 23, 1989 [DE] Fed. Rep. of Germany ... 8910102[U]

[51] Int. Cl.⁵ .............................................. G06F 13/14
[52] U.S. Cl. ................................... 395/325; 395/425; 364/242.91; 364/242.3; 364/DIG. 1
[58] Field of Search ............... 395/325, 275, 425, 250; 364/242.91, 242.3, DIG. 1

[56] References Cited

U.S. PATENT DOCUMENTS

| | | | |
|---|---|---|---|
| 4,240,138 | 12/1980 | Chauvel | 395/425 |
| 4,245,300 | 1/1981 | Kaufman et al. | 395/275 |
| 4,422,142 | 12/1983 | Inaba et al. | 395/325 |
| 4,550,368 | 10/1985 | Bechtolsheim | 395/400 |
| 4,591,982 | 5/1986 | Buonomo et al. | 395/375 |
| 4,621,318 | 11/1986 | Maeda | 395/425 |
| 4,771,286 | 9/1988 | Niessen et al. | 340/825.52 |
| 4,901,234 | 2/1990 | Heath et al. | 395/425 |
| 4,933,835 | 6/1990 | Sachs et al. | 395/425 |
| 4,965,717 | 10/1990 | Cutts, Jr. et al. | 395/425 |

FOREIGN PATENT DOCUMENTS

| | | | |
|---|---|---|---|
| 59-103121 | 6/1984 | Japan | G06F 3/80 |
| 1485758 | 9/1977 | United Kingdom | G06F 13/00 |

OTHER PUBLICATIONS

Halang, Wolfgang A. *Microprocessing and Microprogramming*, "On Methods for Direct Memory Access Without Cycle Stealing", Amsterdam, Netherlands, May 1986.

*Primary Examiner*—Michael R. Fleming
*Assistant Examiner*—Glenn A. Auve
*Attorney, Agent, or Firm*—Richard J. Paciulan; Denis G. Maloney

[57] ABSTRACT

A method and apparatus for controlling accesses to main memory by a CPU includes a CPU coupled to the main memory by a first switching device. A system bus is coupled to main memory by a second switching device. The system bus couples a plurality of functional units to main memory. The first and second switching devices are interconnected so that only one of the two switching mechanisms can release the connection between the CPU or the system bus and the main memory. Advantageously, a first buffer is coupled between the main memory and the CPU for temporary storage of data which is to be transferred between the CPU and main memory, and a second buffer is coupled between main memory and the system bus for temporary storage of data which is to be transferred between the system bus and main memory. The main memory, the first and second switching mechanisms as well as the first and second buffers are provided on the same board as the CPU.

10 Claims, 3 Drawing Sheets

DATA PROCESSING SYSTEM AND METHOD FOR CONTROLLING THE LATTER AS WELL AS A CPU BOARD

This application is a continuation of application Ser. No. 07/684,890, filed Apr. 23, 1991, now abandoned.

BACKGROUND OF THE INVENTION

The invention relates to a data processing system and a method for controlling the latter with the data processing system having a central processing unit (CPU), a main memory and a system bus which can be connected to the main memory and other functional units. The invention also relates to a CPU board for a data processing system in which the CPU is mounted on its own board.

Normally, the CPU, main memory and the input/output units (I/O units) or their controllers are each on a board, also referred to as a card. All functional units connected to the system bus are thus controlled centrally by the central processing unit (CPU), e.g. by a microprocessor. As a result, communication between the functional units and the CPU always takes place via the system bus.

For example, if an I/O unit wishes to transfer data with the main memory, i.e., input data to the main memory or output data from the main memory, the I/O unit sends a signal to the system bus; on the basis of this signal, the CPU is "halted" for a brief period of time while the I/O unit is permitted to directly access the main memory, a process also referred to as DMA (direct memory access).

Since a great many direct accesses are made to the main memory, particularly during peak load operation, jams and long waiting periods occur; this is due to the fact that the system bus timing is standardized and therefore cannot be accelerated to any speed, especially since all plug-in cards on the system bus must adhere to certain invariable timings.

An entire range of techniques are known for the simultaneous processing of as many tasks as possible in data processing systems. For example, so-called cache memories are used as small, fast buffers and are placed on the same board as the CPU. The CPU then outputs the data from the main memory via the system bus and writes these data to the fast cache memory located on the CPU board. If the CPU attempts to reaccess this data, it no longer has to transfer the data from the main memory via the relatively slow system bus, but can directly access the fast cache memory.

Due to advanced integration technology, it has become possible to place the CPU and main memory on a single board. Since communication between the I/O units and the main memory continues to take place via the system bus, the latter is blocked to the main memory by frequent DMA accesses, i.e. accesses by I/O units with direct access, so that long waiting periods again occur.

SUMMARY OF THE INVENTION

In contrast, the purpose of the invention is to increase the performance of the data processing system so that as many tasks as possible can be processed simultaneously and waiting periods on the system bus reduced.

This objective is reached by the fact that the main memory can be directly connected to the CPU; a first switching mechanism, which controls the connection between the CPU and main memory, and a second switching mechanism, which controls the connection between the system bus and the main memory, are provided; the first and second switching mechanisms are interconnected so that only one of the two switching mechanisms can release the connection between the CPU or the system bus and the main memory.

This makes it possible to access the main memory from either the CPU or the system bus, and the main memory need be blocked to the opposite side only for the period in which the memory is actually being accessed, but not for the entire access cycle.

The fact that a first buffer, which is controlled by the first switching mechanism, is provided between the CPU and main memory and a second buffer is located between the system bus and main memory ensures that data is correctly transferred between the CPU and main memory as well as between the system bus and main memory.

The main memory, the first and second switching mechanisms and the first and second buffers should be mounted on the same board as the CPU.

In an additional version of the invention, one or more I/O units without direct memory access are provided; they can be directly connected to the CPU via a CPU bus, and the CPU can be connected either to the main memory or to one of the I/O units without direct memory access. This makes it possible for the CPU to directly access I/O units even if the system bus is blocking the path between the main memory and a DMA unit. As a result, it is possible to further increase the performance of the data processing system.

The CPU board according to the invention, which is described in claims 7 through 11, can be sold separately from the data processing system as long as compatibility with the appropriate data processing system is guaranteed.

The method according to the invention is described in claims 12 through 16.

A version of the invention is described in greater detail on the basis of the drawings.

DESCRIPTION OF THE PREFERRED EMBODIMENT

Figure 1:
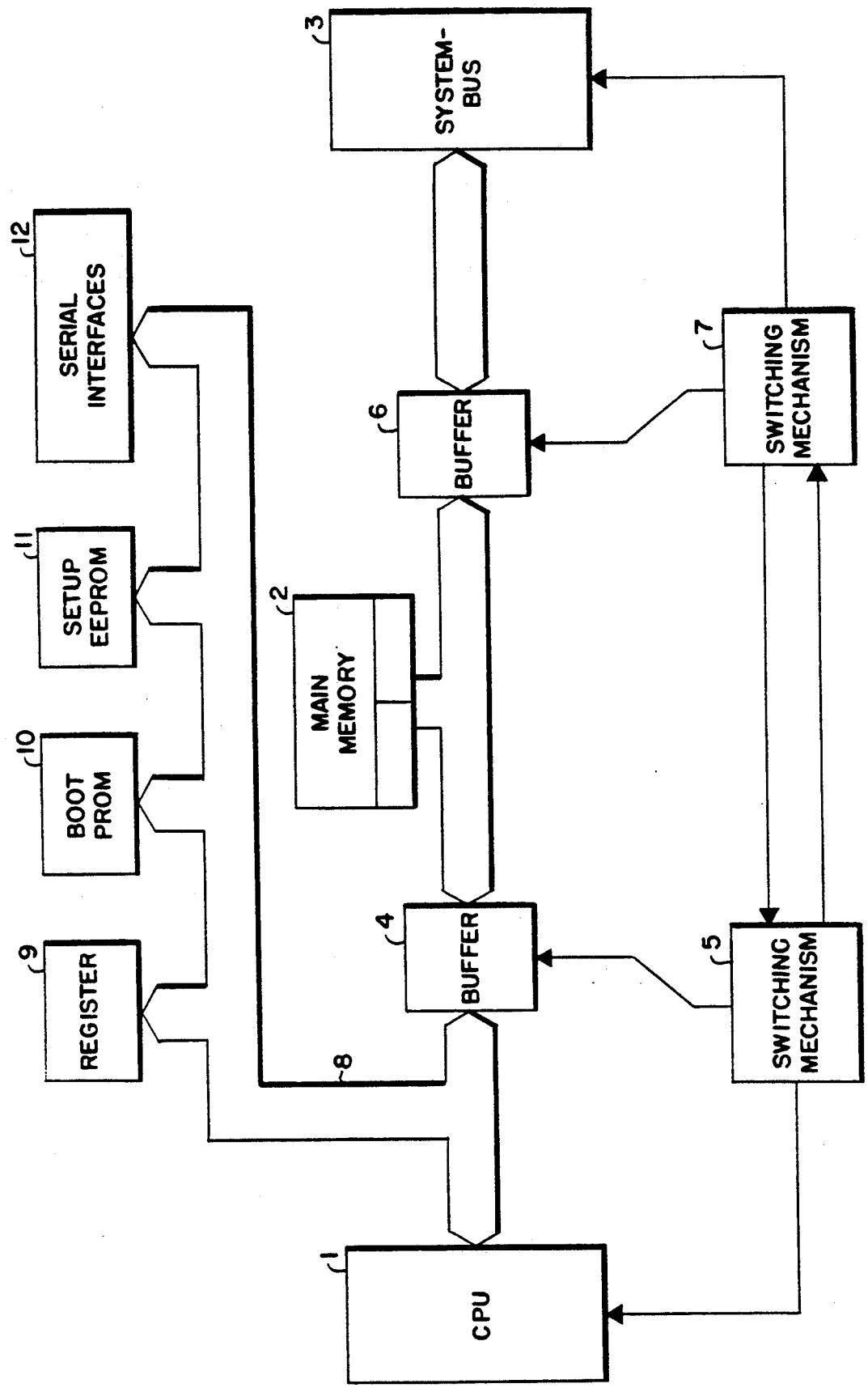
FIG. 1 shows a schematic block diagram of a data processing system according to the invention.

As shown in FIG. 1, the data processing system according to the invention has a central processing unit (CPU) (1), a main memory (2) and a system bus (3).

The CPU (1) is connected to the main memory (2) via a first buffer (4). The connection is then controlled via a first switching mechanism (5).

The main memory (2) is also connected to the system bus (3) via a buffer (6), and the connection is controlled by a second switching mechanism (7).

The data processing system according to the invention also has a CPU bus (8) which connects the CPU (1) to a number of I/O units without direct access, i.e. I/O units without DMA. The version illustrated consists of a register set (9), a boot PROM (10) and a setup EEPROM (11) as well as additional serial interfaces (12).

I/O units (9) through (12) are typical I/O units which are connected to the system bus (3) in known data processing systems. Thus, register set (9) normally has an interrupt controller, a clock-pulse generator and a real-time clock. As usual, boot PROM (10) and set EEPROM (11) contain the functions for starting the system, configuration data, hardware-related functions, diagnostic programs, self-test programs, etc.

The serial interfaces (12) include, for example, eight interrupt-capable serial lines connected to the system console, terminals, printers, modems and similar devices. In addition, a floating-point unit (not illustrated) can be connected in the usual manner to the CPU bus.

All components illustrated in FIG. 1 should be placed on the CPU board.

Operation of the data processing system according to the invention is described below.

Since the CPU (1) or I/O units with direct access (DMA units), which are connected to the system bus in the usual manner and are not illustrated in FIG. 1 for reasons of clarity, can access the main memory (2) simultaneously via the system bus (3), technical implementation requires the use of two switching mechanisms which control the timing in the appropriate system part.

The first switching mechanism (5) controls all CPU-related processes such as accesses from the CPU (1) to the main memory (2) and to the I/O units without DMA, which are marked by reference numbers (9) through (12) in FIG. 1.

The second switching mechanism (7) controls processing of DMA requests from the system bus (3), the actual accesses by DMA units as well as accesses from the CPU (1) to the system bus (3).

The first switching mechanism (5) and the second switching mechanism (7) work in so-called handshaking mode, which guarantees mutual blocking when access requests occur at the same time.

Operation of the first switching mechanism (5) is described in greater detail below on the basis of FIG. 2.

Firstly, the first switching mechanism (5) is in a wait status (100). In step (101), the system asks whether the CPU (1) is to access the main memory (2). If it is not to do this, the system asks in step (102) whether a request regarding or an interrupt from one of the I/O units without DMA marked by reference numbers (9) through (12) in FIG. 1 is present. If it is present, the request or interrupt is processed in step (103).

If the system determines in step (101) that the main memory (2) is to be accessed, switching mechanism (5) assigns the main memory (2) in step (104) and sends a relevant assign signal to switching mechanism (7). If the system determines in step (105) that the main memory (2) is busy, i.e., an access from a DMA unit via the system bus (3) to the main memory (2) is present, it waits until the main memory (2) is free. In step (106), the memory operation is then carried out, and buffer (4) is controlled by switching mechanism (5). At the end of the memory operation, the main memory (2) is again released in step (107) and an appropriate release signal sent from switching mechanism (5) to switching mechanism (7).

Operation of the second switching mechanism (7) is described in greater detail below on the basis of FIG. 3.

Firstly, the second switching mechanism (7) is in a wait status (200). In step (201), the system asks whether a request from a DMA unit via the system bus (3) is present. If one is present, switching mechanism (7) sends the DMA release to the system bus (3) in step (202). A bidirectional connection is then established from switching mechanism (7) via the system bus (3) to the DMA unit connected to the system bus (3) and the first part of the bus protocol is processed in step (203). Switching mechanism (7) then assigns the main memory (2) and sends an appropriate assign signal to switching mechanism (5). If the system determines in step (205) that the main memory (2) is busy, i.e., an access from the CPU (1) to the main memory (2) is present, it waits until the main memory (2) is free. In step (206), the memory operation is then carried out, and buffer (6) is controlled by switching mechanism (7).

At the end of the memory operation, the main memory (2) is released in step (207) and an appropriate release signal is sent from switching mechanism (7) to switching mechanism (5). In step (208), the second part of the bus protocol is then processed through communication between switching mechanism (7) and the DMA unit.

The device which can access the main memory (2) is thus determined by the two fast switching mechanisms (5) and (7) which communicate with each other and operate in handshaking mode.

Figure 2:
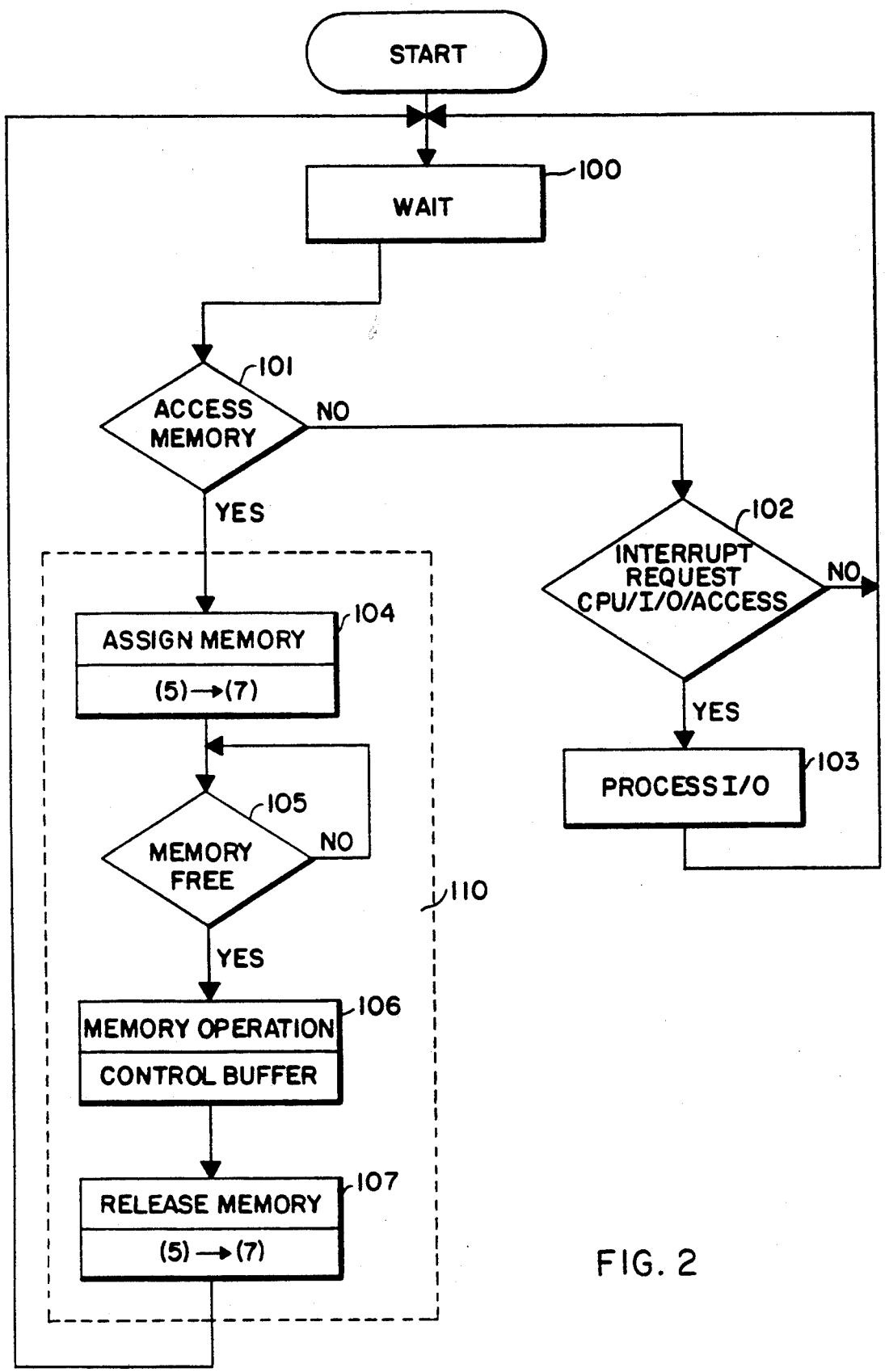
FIG. 2 shows a flowchart for illustrating the operation of a first switching mechanism.
Figure 3:
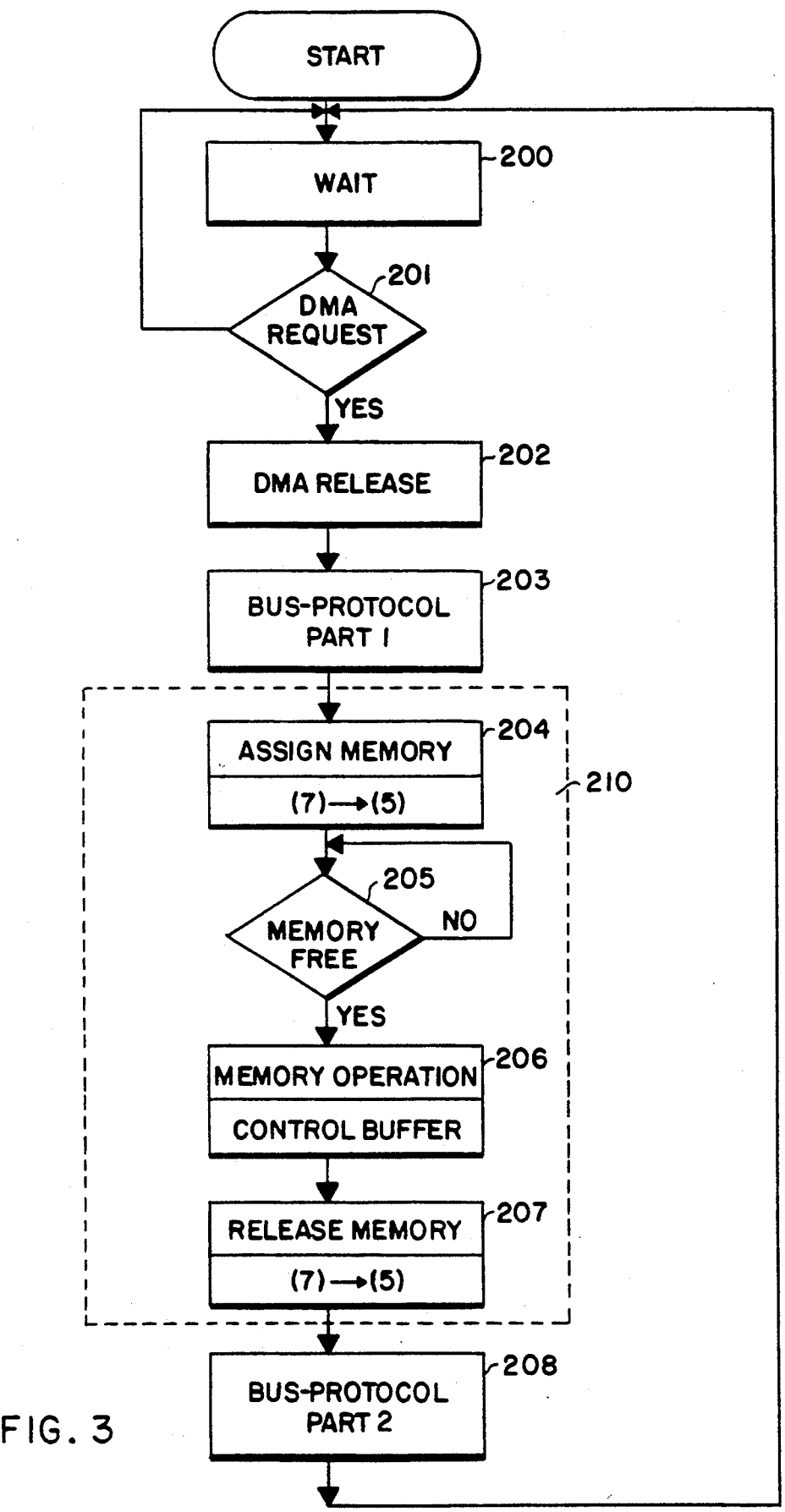
FIG. 3 shows a flowchart for illustrating the operation of a second switching mechanism.

FIGS. 2 and 3 directly illustrate that the main memory (2) is assigned only during the period of time absolutely necessary. This period is indicated by the broken lines and marked by the reference number (110) in FIG. 2 and by reference number (210) in FIG. 3.

During the remaining period, i.e. the remaining processing time for a DMA access or a CPU access to the main memory or even during CPU access to the I/O units without DMA access marked by reference numbers (9) through (12), the main memory can be released and assigned for a new request.

The version according to the invention prevents the main memory from being assigned during the entire standardized processing time of a DMA access, which runs from steps (201) to (208) in FIG. 3; instead it can be assigned only during the absolutely necessary period resulting from steps (204) to (207) in FIG. 3. The time designates as idle time (steps 201 to 203 and step 208 in FIG. 3) between memory assignment (steps 204 to 207 in FIG. 3) and standard processing time (steps 201 to 208 in FIG. 3) can be used for other purposes, e.g. for access by the CPU to the main memory in order to nest the actual memory accesses close together in time.

As a further way to increase system performance, the CPU can process requests from I/O units without DMA access during the time in which the main memory is assigned by the system bus, thereby permitting true parallel processing.

What I claim is:

1. An apparatus comprising:
    a central processing unit (CPU);
    a main memory coupled to said CPU, said main memory having a total access time, a portion of said total access time including a data transfer period;
    a system bus coupled between said main memory and a plurality of functional units;
    first means for providing exclusive access by said CPU to said main memory during said data transfer period of said main memory and for allowing said system bus to access said main memory in a remaining portion of said total access time of said main memory;
    second means for providing exclusive access by said system bus to said main memory during said data transfer period of said main memory, and for allowing access by said CPU in said remaining portion of said total access time of said main memory; and means, coupled between said first means and said second means, for transmitting between said first means and said second means, signals corresponding to whether said exclusive access is between the system bus and the main memory or is between the CPU and the main memory.

2. Apparatus as in claim 1 further comprising:

a first buffer coupled between said CPU and said main memory and controlled by said first means; and a second buffer coupled between said system bus and said main memory and controlled by said second means.

3. The apparatus of claim 2 wherein said main memory, said first means, said second means, said first buffer and said second buffer are mounted on one physical board along with said CPU.

4. The apparatus of claim 1 further comprising:

at least one I/O unit which does not require direct memory access coupled by a dedicated bus to said CPU; and wherein said CPU may process transactions from said I/O unit which does not require DMA during the time interval in which said system bus accesses said main memory.

5. A method for controlling a data processing system having a central processing unit (CPU), a main memory having a total access time, a portion of said total access time including a data transfer period and a system bus coupling said main memory to a plurality of functional units, said method for controlling said data processing system comprising the steps of:

providing a first means, coupled to said CPU and said main memory to provide exclusive access to said main memory by said CPU during said data transfer period of said main memory and for allowing said system bus to access main memory during a remaining portion of said total access time of said main memory;

providing a second means, coupled to said system bus and said main memory to provide exclusive access to said main memory by said system bus during said data transfer period of said main memory and for allowing said CPU to access main memory during the remaining portion of said total access time of said system bus access; and transmitting between said first means and said second means signals corresponding to whether said exclusive access is between the system bus and the main memory or is between the CPU and the main memory.

6. The method according to claim 5 further comprising the steps of:

coupling a first buffer between said CPU and said main memory, said first buffer being controlled by said first means, to store data which is transmitted between said CPU and said main memory; and coupling a second buffer between said system bus and said main memory, said second buffer being controlled by said second means, to store data which is transmitted between said system bus and said main memory.

7. The method according to claim 5 further comprising the step of:

providing a dedicated bus to couple said CPU to an I/O unit which does not require direct memory access; and allowing said CPU to transfer data between said I/O unit which does not require DMA via said dedicated bus while said system bus is accessing said main memory.

8. A method comprising the steps of:

providing exclusive access to a main memory by a CPU during a data transfer period of a memory access cycle initiated by said CPU;

providing exclusive access to said main memory by a system bus during a second data transfer period of a second memory access initiated by said system bus;

allowing said CPU to access said main memory during a remaining portion of said memory access initiated by said system bus and allowing said system bus to access said main memory during a remaining portion of said memory access initiated by said CPU.

9. An apparatus comprising:

a central processing unit (CPU);

a main memory coupled to said CPU;

a system bus coupled between said main memory and a plurality of functional units;

first means for providing exclusive access by said CPU to said main memory and for allowing said system bus to access said main memory when said CPU does not have exclusive access;

second means for providing exclusive access by said system bus to said main memory and for allowing access by said CPU when said system bus does not have exclusive access; and means, coupled between said first means and said second means, for transmitting between said first means and said second means, signals corresponding to whether said exclusive access is between the system bus and the main memory or is between the CPU and the main memory.

10. A method for controlling a data processing system having a central processing unit (CPU), a main memory and a system bus coupling said main memory to a plurality of functional units, said method for controlling said data processing system comprising the steps of:

providing a first means, coupled to said CPU and to said main memory to provide exclusive access to said main memory by said CPU and for allowing said system bus to access said main memory when said CPU does not have exclusive access;

providing a second means, coupled to said system bus and said main memory to provide exclusive access to said main memory by said system bus and for allowing said CPU to access main memory when said system bus does not have exclusive access; and transmitting between said first means and said second means signals corresponding to whether said exclusive access is between the system bus and the main memory or is between the CPU and the main memory.

* * * * *